(12) United States Patent
Sakai et al.

(10) Patent No.: US 7,029,772 B2
(45) Date of Patent: Apr. 18, 2006

(54) MAGNETIC RECORDING MEDIUM, PRODUCTION PROCESS THEREOF, AND MAGNETIC RECORDING AND REPRODUCING APPARATUS

(75) Inventors: Hiroshi Sakai, Chiba (JP); Tetsuya Osaka, Tokyo (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 460 days.

(21) Appl. No.: 09/949,018

(22) Filed: Sep. 10, 2001

(65) Prior Publication Data

US 2002/0058344 A1    May 16, 2002

Related U.S. Application Data

(60) Provisional application No. 60/263,238, filed on Jan. 23, 2001.

(30) Foreign Application Priority Data

Sep. 11, 2000    (JP)    ............... P2000-275571

(51) Int. Cl.
  *G11B 5/66*    (2006.01)
  *G11B 5/70*    (2006.01)
(52) U.S. Cl. ........................ 428/832; 428/828
(58) Field of Classification Search ............ 428/692,
    428/693, 694 TS, 694 T, 694 MM, 332, 336,
    428/694, 832, 828
See application file for complete search history.

(56) References Cited

U.S. PATENT DOCUMENTS

| 5,792,564 A | * | 8/1998 | Hikosaka et al. ............ 428/610 |
| 5,830,569 A | * | 11/1998 | Hikosaka et al. ............ 428/332 |
| 6,524,730 B1 | * | 2/2003 | Chen ................... 428/694 TM |
| 2002/0004148 A1 | * | 1/2002 | Shimizu et al. ........... 428/694 T |

FOREIGN PATENT DOCUMENTS

| JP | 6-111403 | | 4/1994 |
| JP | 8-30951 | | 2/1996 |
| JP | 08-030951 | * | 2/1996 |

OTHER PUBLICATIONS

Translation of JP08-030951.*

* cited by examiner

*Primary Examiner*—Holly Rickman
(74) *Attorney, Agent, or Firm*—Sughrue Mion, PLLC

(57) ABSTRACT

A magnetic recording medium that enables enhancement of squareness ratio and Hn and exhibits excellent noise characteristics and thermal stability is disclosed. A production process for the medium, and a magnetic recording and reproducing apparatus are also disclosed. The magnetic recording medium including a substrate 1, a carbon-containing carbon undercoat film 2 formed thereon, and a perpendicular magnetic film 3, in which most of easy-magnetization axes are oriented vertically with respect to the substrate, formed on the undercoat film. The perpendicular magnetic film is formed through a plurality of sputtering operations using at least one element selected from Pt and Pd and through a plurality of sputtering operations using a Co-containing material.

9 Claims, 4 Drawing Sheets

MAGNETIC RECORDING MEDIUM, PRODUCTION PROCESS THEREOF, AND MAGNETIC RECORDING AND REPRODUCING APPARATUS

CROSS REFERENCE TO RELATED APPLICATIONS

This application is an application filed under 35 U.S.C. §111(a) claiming benefit pursuant to 35 U.S.C. §119(e)(1) of the filing date of Provisional Application 60/263,238 filed Jan. 23, 2001 pursuant to 35 U.S.C. §111(b).

FIELD OF THE INVENTION

The present invention relates to a magnetic recording medium including a perpendicular magnetic film in which most of easy-magnetization axes are oriented vertically with respect to a substrate; a process for producing the medium; and a magnetic recording and reproducing apparatus.

BACKGROUND OF THE INVENTION

Most magnetic recording media which are commercially available at present are of a longitudinal recording type, in which most of easy-magnetization axes in a magnetic film are oriented horizontally with respect to a substrate.

In order to increase recording density in such a longitudinal magnetic recording medium, the size of magnetic particles must be decreased to reduce noise. However, when the size of a magnetic particle is decreased, the volume of the particle is also decreased, and consequently, reproduction characteristics of the medium may deteriorate due to thermal instability. In addition, when recording density is increased, the effect of a diamagnetic field at a recording bit boundary may cause an increase in medium noise.

In contrast, in a perpendicular magnetic recording medium, in which most of easy-magnetization axes in a magnetic film are oriented vertically with respect to a substrate, the effect of a diamagnetic field at a recording bit boundary is minimal even when recording density is increased, and recording magnetic domains having clear boundaries are formed, thereby enabling noise reduction.

In addition, even when the volume of a magnetic particle is relatively large, recording density can be increased, and thus thermal stability can be enhanced. Therefore, a perpendicular magnetic recording medium has recently become of interest.

For example, Japanese Patent Application Laid-Open (kokai) No. 60-214417 discloses a perpendicular magnetic recording medium including a perpendicular magnetic film formed from a Co alloy, and an undercoat film formed from Ge or Si.

Japanese Patent Application Laid-Open (kokai) No. 63-211117 discloses a perpendicular magnetic recording medium including a perpendicular magnetic film formed from a Co alloy, and a film (thickness: 1 to 100 Å) formed from a carbon-containing material, serving as an undercoat film of the magnetic film.

However, the aforementioned conventional magnetic recording media encounter difficulty in enhancing squareness ratio, and involve a problem that a nucleation field (Hn) is lowered. Therefore, the media exhibit poor thermal stability when recording density is decreased.

In contrast, magnetic recording media which enable enhancement of Hn have been proposed, each of such media including a multi-layer film containing a plurality of layers of transition metal (e.g., Co) and layers of noble metal (e.g., Pt) (Japanese Patent Application Laid-Open (kokai) Nos. 6-111403 and 8-30951, and U.S. Pat. No. 5,660,930).

In recent years, there has been demand for magnetic recording media of higher recording density, and in accordance with this trend, further improvements to noise characteristics have been required.

However, the aforementioned conventional magnetic recording media (each including a multi-layer film containing transition metal layers and noble metal layers) are not satisfactory in terms of noise characteristics, and thus there has been demand for a magnetic recording medium that exhibits excellent noise characteristics.

SUMMARY OF THE INVENTION

In view of the foregoing, an object of the present invention is to provide a magnetic recording medium which enables enhancement of squareness ratio and Hn, and exhibits excellent noise characteristics; a process for producing the medium; and a magnetic recording and reproducing apparatus including the medium.

The present invention provides a magnetic recording medium comprising a substrate; a carbon-containing carbon undercoat film formed thereon; and a perpendicular magnetic film, in which most of easy-magnetization axes are oriented vertically with respect to the substrate, formed on the undercoat film. The perpendicular magnetic film is formed through a plurality of sputtering operations using at least one element selected from Pt and Pd and through a plurality of sputtering operations using a Co-containing material. In the case of perpendicular type, the "most" used herein describes the state of vertical orientation when the coercive force in the vertical direction is higher than the coercive force of the in-plane direction when the coercive force of the magnetic recording medium is measured.

Preferably, the thickness of the carbon undercoat film is in excess of 1 nm and 100 nm or less.

The perpendicular magnetic film may have a multi-layer structure containing a plurality of noble metal layers formed from at least one element selected from Pt and Pd, and a plurality of Co-containing cobalt layers.

In the magnetic recording medium of the present invention, Hn is preferably 1,500 to 4,500 (Oe).

Preferably, the noble metal layer is formed to attain a thickness of 0.4–1.4 nm.

Preferably, the cobalt layer is formed to attain a thickness of 0.1–0.6 nm.

At least a portion of the perpendicular magnetic film may be formed from an alloy containing Co and at least one of Pt and Pd.

The present invention also provides a process for producing a magnetic recording medium comprising a substrate, a carbon-containing carbon undercoat film formed thereon, and a perpendicular magnetic film, in which most of easy-magnetization axes are oriented vertically with respect to the substrate, formed on the undercoat film. The process comprises forming the perpendicular magnetic film through a plurality of sputtering operations using at least one element selected from Pt and Pd and through a plurality of sputtering operations using a Co-containing material.

The present invention also provides a magnetic recording and reproducing apparatus comprising a magnetic recording medium and a magnetic head for recording data onto the medium and reproducing the data therefrom The magnetic recording medium comprises a substrate, a carbon undercoat film formed thereon, and a perpendicular magnetic film, in which most of easy-magnetization axes are oriented vertically with respect to the substrate, formed on the undercoat film. The carbon undercoat film contains carbon; and the perpendicular magnetic film is formed through a plurality of sputtering operations using at least one element selected from Pt and Pd and through a plurality of sputtering operations using a Co-containing material.

DESCRIPTION OF THE INVENTION

Figure 1A:
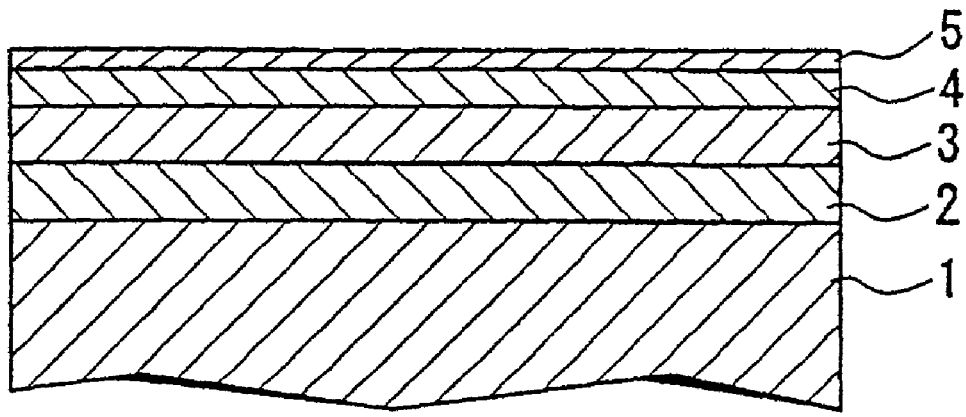
FIG. 1(a) is a partial cross-sectional view showing an embodiment of the magnetic recording medium of the present invention.

FIG. 1 shows an embodiment of the magnetic recording medium of the present invention. The magnetic recording medium includes a substrate 1; a carbon undercoat film 2 formed thereon; a perpendicular magnetic film 3, in which most of easy-magnetization axes are oriented vertically with respect to the substrate, formed on the undercoat film 2; a protective film 4; and a lubrication film 5. The films 4 and 5 are successively formed on the magnetic film 3.

The substrate 1 may be an aluminum alloy substrate on which an NiP plating film is formed (hereinafter the substrate will be referred to as an "NiP-plated Al substrate"), which is generally employed as a substrate for magnetic recording media; or a substrate of glass, ceramic, carbon, or flexible resin, which may be coated with an NiP film through plating or sputtering.

The carbon undercoat film 2 is formed from a carbon-containing material.

The thickness of the carbon undercoat film 2 preferably falls within a range of more than 1 nm and 100 nm or less (i.e., a range of more than 10 Å and 1,000 Å or less).

From the viewpoints of noise characteristics, coercive force, and nucleation field (Hn), the thickness of the carbon undercoat film 2 is preferably 30–100 nm (i.e., 300–1,000 Å), more preferably 40–90 nm (i.e., 400–900 Å).

When the thickness of the carbon undercoat film 2 falls below the above range, coercive force and noise characteristics are easily impaired. In contrast, when the thickness exceeds the above range, surface characteristics of the carbon undercoat film 2 are easily deteriorated.

The perpendicular magnetic film 3 is formed through a plurality of sputtering operations using at least one element selected from Pt and Pd and through a plurality of sputtering operations using a Co-containing material.

Figure 1B:
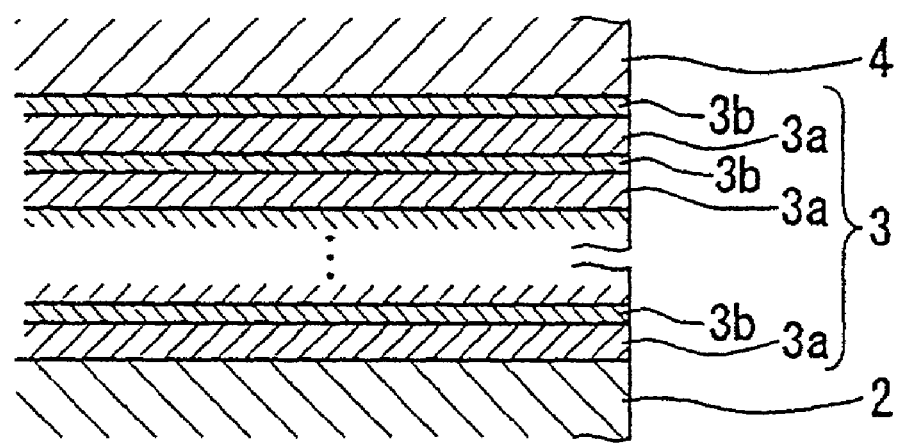
FIG. 1(b) is an enlarged view showing an essential portion of the magnetic recording medium shown in FIG. 1(a).

As shown in FIG. 1(b), in an embodiment of the present invention, the perpendicular magnetic film 3 has a multi-layer structure containing a plurality of noble metal layers 3a formed from at least one element selected from Pt and Pd, and a plurality of cobalt layers 3b formed from a Co-containing material, in which the noble metal layer 3a and the cobalt layer 3b are alternately laminated.

The material of the noble metal layer 3a may be a single element selected from Pt and Pd, or an alloy of Pt and Pd.

The thickness of the noble metal layer 3a is preferably 0.4–1.4 nm (i.e., 4–14 Å), more preferably 0.6–1.0 nm. When the thickness of the layer 3a falls outside the above range, coercive force and Hn (nucleation field) are lowered. In addition, noise characteristics are easily deteriorated.

The material of the cobalt layer 3b may be a single element of Co, or a Co alloy containing Co as a primary component and another element (e.g., Cr, Ta, or C).

The thickness of the cobalt layer 3b is preferably 0.1–0.6 nm (i.e., 1–6 Å), more preferably 0.1–0.4 nm. When the thickness of the layer 3b falls outside the above range, coercive force and Hn (nucleation field) are lowered. In addition, noise characteristics are easily deteriorated.

The total number of the noble metal layers 3a and the cobalt layers 3b is preferably 10 to 60.

In the perpendicular magnetic film 3, the lowermost layer may be the noble metal layer 3a or the cobalt layer 3b, but preferably, the lowermost layer is the noble metal layer 3a.

The protective film 4 is provided for preventing corrosion of the perpendicular magnetic film 3, for protecting the surface of the magnetic recording medium from any damage when a magnetic head is brought into contact with the medium, and for maintaining lubrication characteristics between the head and the medium. Conventionally known materials may be used for forming the film 4. Examples of such materials include a single composition of C, $SiO_2$, or $ZrO_2$; and a composition containing C, $SiO_2$, or $ZrO_2$ as a primary component and other elements.

The thickness of the protective film 4 is preferably 1–10 nm (i.e., 10–100 Å).

The lubrication film 5 may be formed from a lubricant such as perfluoropolyether, fluorinated alcohol, or fluorinated carboxylic acid.

In the magnetic recording medium, a nucleation field (Hn) is preferably 1,500–4,500 (Oe). When Hn is below the above range, thermal stability is lowered at low recording density, whereas when Hn is in excess of the above range, recording characteristics are deteriorated.

When a magnetic recording medium is unidirectionally magnetized completely through application of an external magnetic field, and then the external magnetic field is reversed and the intensity of the reversed magnetic field is increased, magnetization of the medium is reversed. As used herein, the term "nucleation field (Hn)" refers to the intensity of the external magnetic field when magnetization of the medium is reversed.

Figure 2:
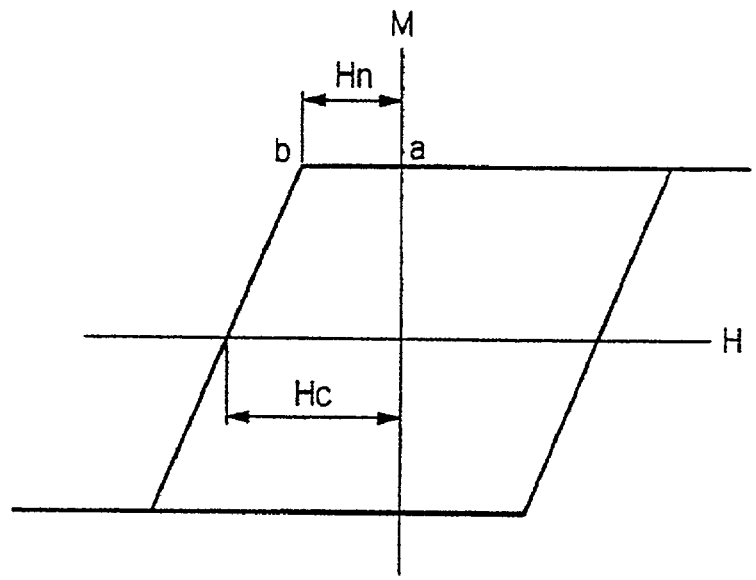
FIG. 2 is an explanatory view showing nucleation field (Hn).

The nucleation field (Hn) can be represented by the distance between a point "a" and a point "b" shown in the hysteresis loop (MH loop) in FIG. 2. At the point a, the external magnetic field is zero. When the intensity of the aforementioned reversed magnetic field is increased, magnetization of the medium is reversed at the point b.

Figure 3:
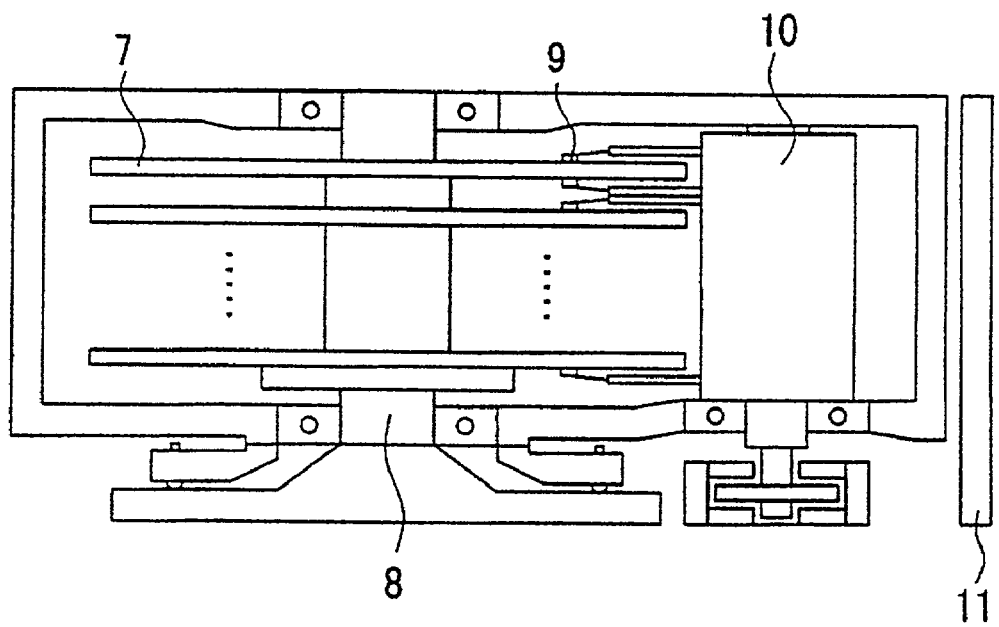
FIG. 3 is a schematic representation showing an embodiment of the magnetic recording and reproducing apparatus including the magnetic recording medium shown in FIG. 1.

FIG. 3 shows an embodiment of the magnetic recording and reproducing apparatus including the aforementioned magnetic recording medium. The apparatus includes a magnetic recording medium 7, the structure of the medium being shown in FIG. 1; a medium-driving portion 8 which rotates the medium 7; a magnetic head 9 which is employed for recording of data onto the medium 7 and for reproduction of the data from the medium 7; a head-driving portion 10; and a recorded/reproduced signal-processing system 11. In the system 11, inputted data are processed and recording signals are sent to the magnetic head 9, or reproduction signals from the head 9 are processed and data are outputted.

In order to produce the magnetic recording medium having the aforementioned structure, firstly, the carbon undercoat film 2 is formed on the substrate 1 through, for example, sputtering. Subsequently, the perpendicular magnetic film 3 is formed on the undercoat film 2 through sputtering.

The carbon undercoat film 2 may be formed through, for example, vacuum deposition or ion-plating.

The perpendicular magnetic film 3 is formed through sputtering using a first sputtering target containing a material constituting the noble metal layer 3a (i.e., at least one element selected from Pt and Pd) and a second sputtering target containing a material constituting the cobalt layer 3b (i.e., a Co-containing material) alternately; i.e., the magnetic film 3 is formed by laminating the noble metal layer 3a and the cobalt layer 3b alternately.

Then, the protective film 4 is formed on the film 3 through, preferably, plasma CVD, an ion-beam method, or sputtering.

Subsequently, the lubrication film 5 is formed on the film 4 through, for example, dipping or spin coating.

According to the magnetic recording medium having the aforementioned structure, squareness ratio and Hn can be enhanced, since the perpendicular magnetic film 3 is formed through a plurality of sputtering operations using at least one element selected from Pt and Pd and through a plurality of sputtering operations using a Co-containing material.

Furthermore, medium noise can be reduced, and noise characteristics can be enhanced.

Since the magnetic recording medium exhibits excellent squareness ratio and Hn, thermal stability can be enhanced, and problems, including loss of recorded data resulting from thermal decay, can be obviated.

According to the aforementioned production process, a magnetic recording medium exhibiting excellent squareness ratio, Hn, and noise characteristics can be easily produced, since the perpendicular magnetic film 3 is formed through sputtering using a first sputtering target containing a material constituting the noble metal layer 3a (i.e., at least one element selected from Pt and Pd) and a second sputtering target containing a material constituting the cobalt layer 3b (i.e., a Co-containing material) alternately; i.e., the magnetic film 3 is formed by laminating the noble metal layer 3a and the cobalt layer 3b alternately.

When the aforementioned magnetic recording and reproducing apparatus is employed, recording density can be increased, since the squareness ratio, Hn, and noise characteristics of the magnetic recording medium can be enhanced.

Since the magnetic recording medium exhibits excellent squareness ratio and Hn, thermal stability can be enhanced, and problems, including loss of recorded data resulting from thermal decay can be obviated.

In the magnetic recording medium of the present invention, the structure of the perpendicular magnetic film is not limited to the multi-layer structure shown in FIG. 1(*b*), so long as the magnetic film is formed through a plurality of sputtering operations using at least one element selected from Pt and Pd and through a plurality of sputtering operations using a Co-containing material.

The present invention encompasses a magnetic recording medium including the perpendicular magnetic film formed of layers of at least one element selected from Pt and Pd and layers of a Co-containing material, in which these layers do not form clear boundaries.

Figure 4A:
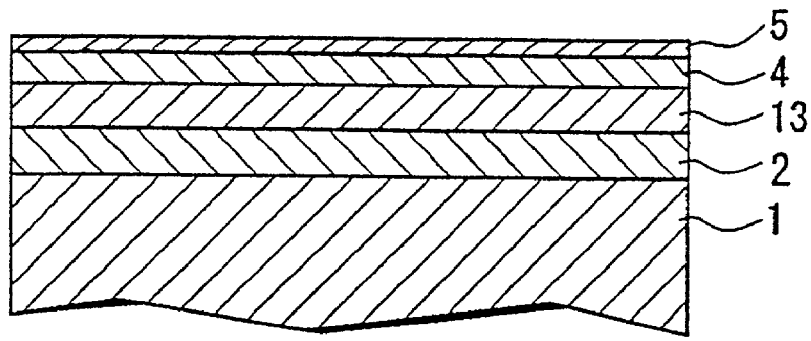
FIG. 4(a) is a partial cross-sectional view showing another embodiment of the magnetic recording medium of the present invention.
Figure 4B:
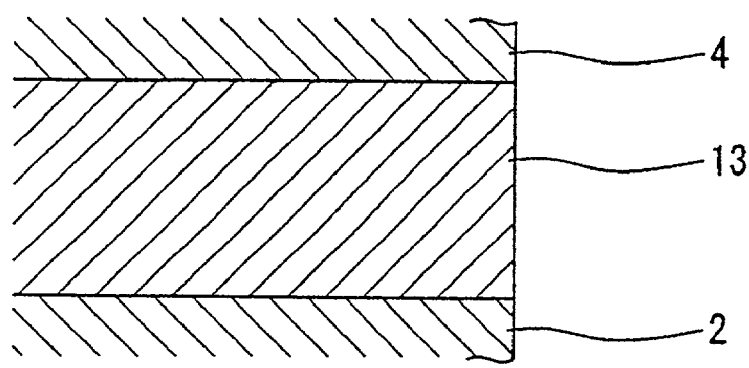
FIG. 4(b) is an enlarged view showing an essential portion of the magnetic recording medium shown in FIG. 4(a).

For example, FIGS. 4(*a*) and (*b*) shows an embodiment of the magnetic recording medium of the present invention, in which a perpendicular magnetic film represented by reference numeral 13 is formed through a plurality of sputtering operations using at least one element selected from Pt and Pd and through a plurality of sputtering operations using a Co-containing material. The magnetic film has a single-layer structure instead of a multi-layer structure.

In the perpendicular magnetic film 13 shown in FIGS. 4(*a*) and (*b*), since at least one element selected from Pt and Pd and a Co-containing material are mixed with each other in at least a portion of the film during formation of the film, clear boundaries between the Pt- or Pd-containing layers and the Co-containing layers are not formed.

Therefore, at least a portion of the perpendicular magnetic film 13 assumes an alloy containing Co and at least one element selected from Pt and Pd.

The magnetic recording medium shown in FIGS. 4(*a*) and (*b*) can exert the effect of enhancing squareness ratio, Hn, and noise characteristics.

In the present invention, a soft magnetic film may be provided between the substrate 1 and the carbon undercoat film 2.

Figure 5:
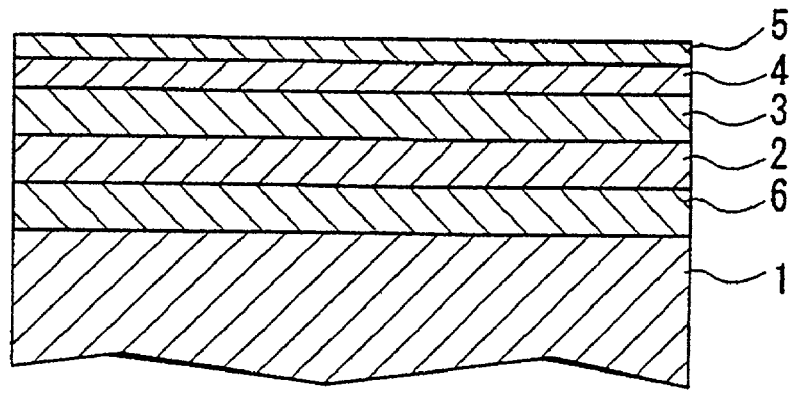
FIG. 5 is a partial cross-sectional view showing yet another embodiment of the magnetic recording medium of the present invention.

FIG. 5 shows an embodiment of the magnetic recording medium in which a soft magnetic film 6 is provided between the substrate 1 and the carbon undercoat film 2.

The material of the soft magnetic film 6 is not particularly limited, but preferably, the film 6 is formed from a single composition of Fe, Ni, or Co, or from an alloy containing Fe, Ni, or Co, and other elements.

Specific examples of the material of the soft magnetic film include alloys such as NiFe, FeC, FeAlSi, CoZrNb, CoTaZr, and FeTaC.

As used herein, the term "primary component" refers to a component which is contained in an amount of more than 50 at %.

EXAMPLES

The effects of the present invention will next be described in detail by way of Examples. The Examples are not intended to limit the scope of the present invention and should not be construed as doing so. Unless indicated otherwise herein, all parts, percents, ratios and the like are by weight.

Example 1

A glass substrate 1 (product of Ohara Inc., outer diameter: 2.5 inches), which had been washed, was placed in the chamber of a DC magnetron sputtering apparatus (Model 3010, product of ANELVA), and the chamber was evacuated to $2 \times 10^{-7}$ Torr. Thereafter, a carbon-containing carbon undercoat film 2 was formed on the substrate 1.

Subsequently, a perpendicular magnetic film 3 was formed on the carbon undercoat film 2 through sputtering operations (10 times) using a first target containing Pd and through sputtering operations (10 times) using a second target containing Co. Sputtering operations using the first and second targets were carried out alternately.

Through a single sputtering operation using the first target, a Pd-containing layer having a thickness of 0.8 nm (i.e., 8 Å) was formed. Through a single sputtering operation using the second target, a Co-containing layer having a thickness of 0.2 nm (i.e., 2 Å) was formed. The overall thickness of the perpendicular magnetic film 3 was 20 nm (i.e., 200 Å).

A protective film 4 (thickness: 7 nm (i.e., 70 Å)) was formed on the perpendicular magnetic film 3 from carbon, and a lubrication film 5 was formed on the protective film 4 from perfluoropolyether through dipping.

Examples 2 through 4

The procedure of Example 1 was repeated, except that the thickness of the carbon undercoat film 2 was varied to produce magnetic recording media.

Example 5

The procedure of Example 2 was repeated, except that a first target containing Pt was used instead of the first target containing Pd to produce a magnetic recording medium.

Magnetostatic characteristics of each of the magnetic recording media of Examples 1 through 6 and Comparative Examples 1 and 2 were measured by use of a vibrating sample magnetometer (VSM).

Read-write characteristics of the magnetic recording medium were measured by use of read/write analyzer RWA1632 and spin stand S1701MP (products of GUZIK).

In order to evaluate read-write characteristics, measurement was performed using, as a magnetic head, a complex-type thin film magnetic recording head containing a giant magnetoresistive (GMR) element at the reproduction portion, and track-recording density was set at 250 kFCI.

Thermal stability (thermal decay) of the magnetic recording medium was measured by means of a method for measuring time-course reduction in output, after writing of data was carried out at a track-recording density of 50 kFCI while the substrate 1 was heated at 70° C.

TABLE 1

| | Undercoat film | | Perpendicular magnetic film | | | | | Magnetostatic characteristics | | Read-write characteristic | Thermal |
|---|---|---|---|---|---|---|---|---|---|---|---|
| | | | Cobalt layer | | Noble metal layer | | | | | | |
| | Material | Thickness (nm) | Material | Thickness (Å) | Material | Thickness (Å) | Number of layers | Hc (Oe) | Hn (Oe) | SNR (dB) | decay (%/decade) |
| Ex. 1 | | Carbon | 30 | Co | 2 | Pd | 8 | 20 | 5200 | 4400 | 14.50 | 0.15 |
| Ex. 2 | | Carbon | 60 | Co | 2 | Pd | 8 | 20 | 5000 | 3800 | 14.80 | 0.13 |
| Ex. 3 | | Carbon | 10 | Co | 2 | Pd | 8 | 20 | 4200 | 3700 | 13.90 | 0.16 |
| Ex. 4 | | Carbon | 5 | Co | 2 | Pd | 8 | 20 | 1800 | 1600 | 6.20 | 0.28 |
| Ex. 5 | | Carbon | 60 | Co | 2 | Pt | 8 | 20 | 4900 | 3700 | 14.75 | 0.12 |
| Ex. 6 | Soft Magnetic Layer | Carbon | 30 | Co | 2 | Pd | 8 | 20 | 5400 | 4200 | 14.15 | 0.14 |
| Comp. Ex. 1 | | Pd | 30 | Co | 2 | Pd | 8 | 20 | 2600 | 2500 | 3.5 | 0.21 |
| Comp. Ex. 2 | | Carbon | 30 | CoCrPtTa | | — | | — | 3500 | 0 | 17.5 | 1.1 |

Example 6

The procedure of Example 1 was repeated, except that a soft magnetic film (thickness: 250 nm) formed from CoZrNb alloy was provided between a substrate and a carbon undercoat film.

Comparative Example 1

The procedure of Example 1 was repeated, except that an undercoat film formed from Pd was provided instead of the carbon undercoat film 2 to produce a magnetic recording medium.

Comparative Example 2

The procedure of Example 1 was repeated, except that a perpendicular magnetic film (thickness: 20 nm (i.e., 200 Å)) formed from a CoCrPtTa alloy was provided instead of the perpendicular magnetic film 3, to thereby produce a magnetic recording medium.

The perpendicular magnetic film was formed through a sputtering operation using a target containing a CoCrPtTa alloy.

As is apparent from Table 1, the magnetic recording media of Examples 1 through 6, in which the carbon undercoat film 2 is provided and the perpendicular magnetic film 3 has a multi-layer structure, have high Hc and Hn and exhibit excellent noise characteristics and thermal stability, as compared with the magnetic recording medium of Comparative Example 1 including the Pd undercoat film.

The results also show that the magnetic recording media of Examples 1 through 6 have high Hc and Hn and exhibit excellent thermal stability compared with the magnetic recording medium of Comparative Example 2 in which the perpendicular magnetic film is formed from a CoCrPtTa alloy.

Comparative Example 3

The procedure of Example 2 was repeated, except that the carbon undercoat film 2 was not provided to produce a magnetic recording medium.

Figure 6:
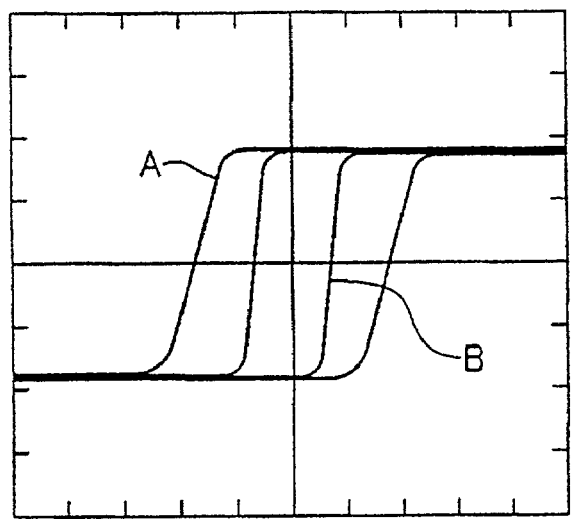
FIG. 6 is a graph showing test results.

FIG. 6 shows hysteresis loops of the magnetic recording media of Example 2 and Comparative Example 3 (reference character A: the medium of Example 2, reference character B: the medium of Comparative Example 3).

As is apparent from FIG. 6, the value of a nucleation field (Hn) becomes high when the carbon undercoat film 2 is provided.

Example 7

The procedure of Example 1 was repeated, except that the thickness of the carbon undercoat film 2 was varied within a range of 0–100 nm to produce magnetic recording media.

Figure 7:
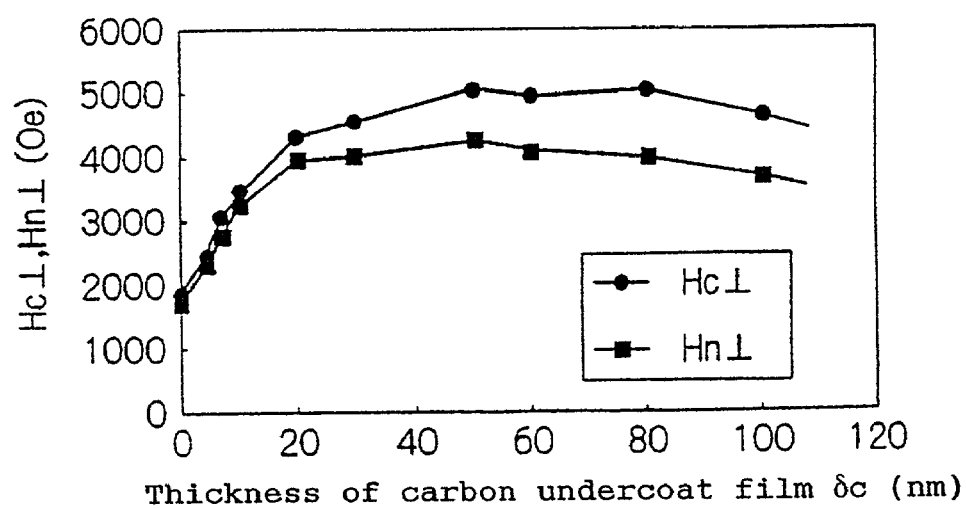
FIG. 7 is a graph showing test results.

FIG. 7 shows the relation between the thickness (δc) of the carbon undercoat film 2 and coercive force (Hc) (perpendicular direction), as well as the relation between the thickness (δc) of the film 2 and nucleation field (Hn).

As is apparent from FIG. 7, when the thickness of the carbon undercoat film 2 is 30–100 nm, particularly 40–90 nm, coercive force (Hc) and nucleation field (Hn) can be enhanced.

As described above, according to the magnetic recording medium of the present invention, squareness ratio and Hn can be enhanced, since the perpendicular magnetic film is formed through a plurality of sputtering operations using at least one element selected from Pt and Pd and through a plurality of sputtering operations using a Co-containing material.

Furthermore, noise characteristics and thermal stability can be enhanced.

According to the process of the present invention for producing a magnetic recording medium, a magnetic recording medium exhibiting excellent squareness ratio, Hn, noise characteristics, and thermal stability can be easily produced, since a perpendicular magnetic film is formed through a plurality of sputtering operations using at least one element selected from Pt and Pd and through a plurality of sputtering operations using a Co-containing material.

When the magnetic recording and reproducing apparatus of the present invention is employed, recording density can be increased, since the squareness ratio, Hn, and noise characteristics of the magnetic recording medium can be enhanced.

Since the magnetic recording medium exhibits excellent squareness ratio and Hn, thermal stability can be enhanced, and problems, including loss of recorded data resulting from thermal decay, can be obviated.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising (1) a substrate; (2) a carbon-containing undercoat film formed thereon; and (3) a perpendicular magnetic film, in which most of easy-magnetization axes are oriented vertically with respect to the substrate, formed directly on the undercoat film,
wherein the perpendicular magnetic film has a single or multilayer structure and is formed through a plurality of sputtering depositions using at least one element selected from the group consisting of Pt and Pd and through a plurality of sputtering depositions using a Co-containing material, and the carbon undercoat film has a thickness of 30 nm to 100 nm, and wherein a sputter deposition of the at least one element selected from the group consisting of Pt and Pd alternates with a sputter deposition of the Co-containing material.

2. A magnetic recording medium comprising (1) a substrate; (2) a carbon-containing undercoat film formed thereon; and (3) a perpendicular magnetic film, in which most of easy-magnetization axes are oriented vertically with respect to the substrate, formed on the undercoat film,
wherein the perpendicular magnetic film is formed in direct contact with the carbon undercoat film and the carbon undercoat film has a thickness of 30 nm to 100 nm,
the perpendicular magnetic film has a multi-layer structure containing a plurality of noble metal layers formed from at least one element selected from the group consisting of Pt and Pd, and a plurality of Co-containing cobalt layers,
each noble metal layer has a thickness of 0.4–1.4 nm, and each cobalt layer has a thickness of 0.1–0.6 nm.

3. A magnetic recording medium according to claim 1, wherein the magnetic recording medium exhibits a Hn of 1,500–4,500 (Oe).

4. A magnetic recording medium according to claim 1, wherein the perpendicular magnetic film comprises a noble metal layer, and the noble metal layer has a thickness of 0.4–1.4 nm.

5. A magnetic recording medium according to claim 1, wherein the perpendicular magnetic film comprises a cobalt layer, and the cobalt layer has a thickness of 0.1–0.6 nm.

6. A magnetic recording medium according to claim 1, wherein at least a portion of the perpendicular magnetic film is formed from an alloy containing Co and at least one of Pt and Pd.

7. A magnetic recording medium according to claim 1, wherein a soft magnetic film is formed between the substrate and the carbon underlayer film.

8. A process for producing a magnetic recording medium comprising a substrate, a carbon-containing undercoat film formed thereon having a thickness of 30 nm to 100 nm, and a perpendicular magnetic film which has a single or multi-layer structure, in which most of easy-magnetization axes are oriented vertically with respect to the substrate, formed directly on the undercoat film, which process comprises:
forming the perpendicular magnetic film through a plurality of sputtering depositions using at least one element selected from the group consisting of Pt and Pd and through a plurality of sputtering depositions using a Co-containing material, and wherein a sputter deposition of the at least one element selected from the group consisting of Pt and Pd alternates with a sputter deposition of the Co-containing material.

9. A magnetic recording and reproducing apparatus comprising a magnetic recording medium and a magnetic head for recording data onto the medium and reproducing the data therefrom,
wherein the magnetic recording medium comprises a substrate, a carbon-containing undercoat film formed thereon having a thickness of 30 nm to 100 nm, and a perpendicular magnetic film, in which most of easy-magnetization axes are oriented vertically with respect to the substrate, formed directly on the undercoat film; and
wherein the perpendicular magnetic film has a single or multilayer structure and is formed through a plurality of sputtering depositions using at least one element selected from the group consisting of Pt and Pd and through a plurality of sputtering depositions using a Co-containing material, and wherein a sputter deposition of the at least one element selected from the group consisting of Pt and Pd alternates with a sputter deposition of the Co-containing material.

* * * * *